United States Patent [19]

Taule

[11] Patent Number: 4,901,473

[45] Date of Patent: Feb. 20, 1990

[54] KNOCKDOWN FURNITURE

[75] Inventor: Joaquin Taule, Rio Piedras, P.R.

[73] Assignee: Tamcor Manufacturing Corporation, Trujillo Alto, P.R.

[21] Appl. No.: 109,398

[22] Filed: Oct. 19, 1987

[51] Int. Cl.$^4$ ............................................. A01G 9/02
[52] U.S. Cl. ........................................ 47/66; 108/159; 248/150; 248/165
[58] Field of Search ............... 47/66, 68; 211/85, 104, 211/105, 118, 150, 165; 108/159, 153

[56] References Cited

U.S. PATENT DOCUMENTS

| | | | |
|---|---|---|---|
| 151,142 | 5/1874 | Lynch | 47/66 |
| 1,109,765 | 9/1914 | Lampert | 248/165 |
| 1,770,722 | 7/1930 | Wright | 248/165 |
| 1,808,082 | 6/1931 | Thompson | 248/165 |
| 1,959,800 | 5/1934 | Rogge | 47/66 |
| 2,480,183 | 8/1949 | Dewey | 248/165 |
| 3,004,814 | 10/1961 | Schulze | 108/159 |
| 3,047,183 | 7/1962 | Papa | 47/66 |
| 3,331,524 | 7/1967 | Wiley | 47/68 |
| 3,759,598 | 9/1973 | Limberger | 108/153 |
| 3,800,470 | 4/1974 | Kleine | 47/68 |
| 4,009,546 | 3/1977 | Buck | 47/68 |
| 4,607,576 | 8/1986 | Kranjec | 108/159 |
| 4,640,045 | 2/1987 | Nesbitt et al. | 47/66 |

FOREIGN PATENT DOCUMENTS

| | | | |
|---|---|---|---|
| 73273 | 8/1916 | Austria | 47/66 |
| 2931352 | 2/1981 | Fed. Rep. of Germany | 108/153 |
| 3429336 | 2/1986 | Fed. Rep. of Germany | 211/118 |
| 2289110 | 10/1974 | France | 47/68 |
| 2113533 | 8/1983 | United Kingdom | 108/153 |

Primary Examiner—Charles T. Jordan
Assistant Examiner—Stephen Johnson
Attorney, Agent, or Firm—Scrivener and Clarke

[57] ABSTRACT

Knockdown furniture composed of four basic components in the forms of side panels, posts, pilasters and a continuous top all of which may be easily releasably joined together in any of a variety of configurations to provide various articles of furniture. A post is releasably disconnected to each end of a panel and pilaster at each corner interconnects the posts.

6 Claims, 3 Drawing Sheets

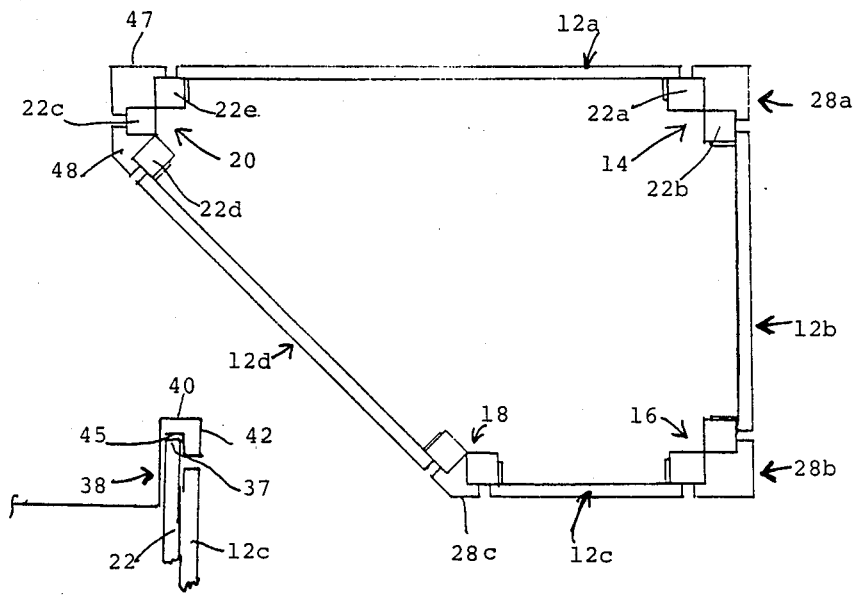
FIG. 3.
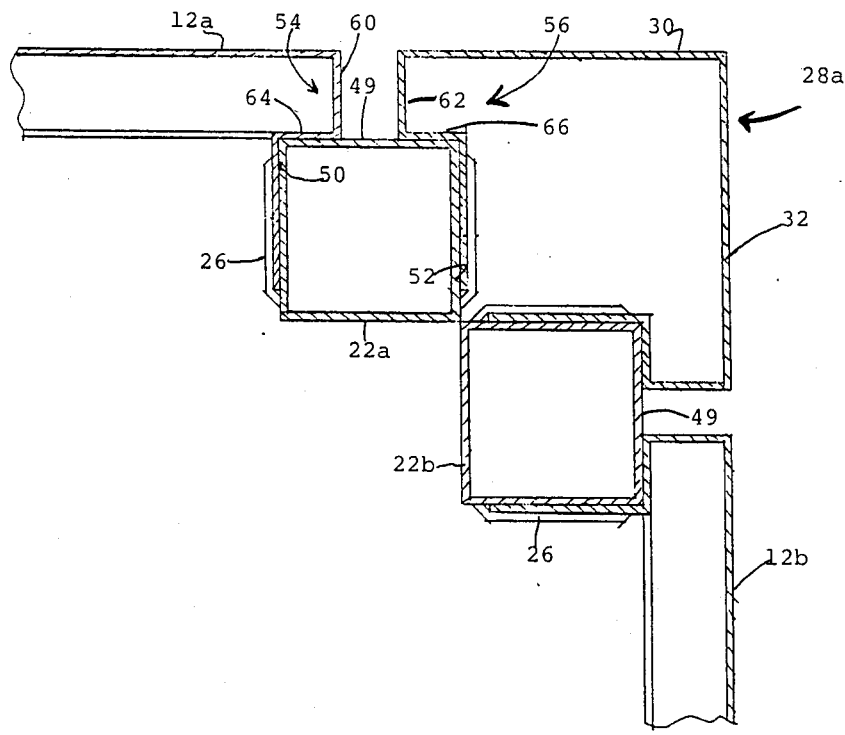
FIG. 6.
FIG. 4.

KNOCKDOWN FURNITURE

FIELD OF THE INVENTION

This invention relates to knockdown furniture and more particularly to knockdown furniture which can be easily assembled in a wide variety of designs using throughout the same basic modular components of panels, posts, corner pilasters and an enveloping top.

BACKGROUND OF THE INVENTION

Knockdown furniture which can be assembled to provide a wide variety of designs has usually required a wide variety of components each suited to the particular design of furniture required. Further, such furniture all too often requires a wide variety of fasteners, special tools and special skills to assemble or disassemble.

SUMMARY OF THE INVENTION

The object of the present invention is to provide knockdown furniture composed of four basic components, namely side panels, posts, corner pilasters and a continuous top for enveloping freely upstanding end parts of the posts. The components may be assembled together to provide a wide variety of furniture types such as a room divider, planters, seats display stands or any combination thereof.

BRIEF DESCRIPTION OF THE DRAWINGS

FIG. 3 is a top plan, somewhat schematic view without the top, showing how the base is assembled to define a closed frame;

FIG. 4 is a detailed view showing the manner by which the side panels and pilasters are joined to the posts;

FIG. 6 is a schematic broken view on a reduced scale showing a preferred construction of the top and its manner of engagement with the posts.

With reference to FIGS. 1, 2, and 3 a typical knockdown furniture 10, in this case a planter, constructed in accordance with the invention is shown as comprising a plurality of planar side panels 12a, 12b, 12c and 12d, at least some of which when the furniture is assembled being angularly related to define a closed frame, as best seen in FIG. 3, of predetermined shape having corners, some of which may be right angled, as at 14 and 6, obtuse as at 18 or acute as at 20. Located at each end of each panel on the inner side thereof is a separate identical vertical post 22 and each post and each panel have complementary interengaging releasable fastening means which may be downturned tongues or hooks 24 on the side edges of the panels which engaged with slot means 26 on the side faces of the posts as best seen in FIG. 5.

At each corner of the frame defined by the adjacent edges and posts of a pair of panels having an angular relationship greater than an acute angle, such as the angles 14, 16 and 18 of FIG. 1, there is a single pilaster 28a, 28b, 28c having in horizontal cross section angularly related sides 30, 32 (FIG. 4) corresponding to the angularity of a pair of adjacent panels such as 12a and 12b. In FIG. 3 it can be seen that the sides of the obtusely angled pilaster 28c has the same degree of angularity as exists between the panels 12c and 12d.

Complementary interengaging releasable fastening means such as the downwardly extending tongues 34 and slots 36 are provided respectively on each side of each pilaster and on each post for releasably connecting together the two posts 22a and 22b (FIG. 4) at the respective adjacent ends of a pair of panels such as 12a and 12b.

Figure 1:
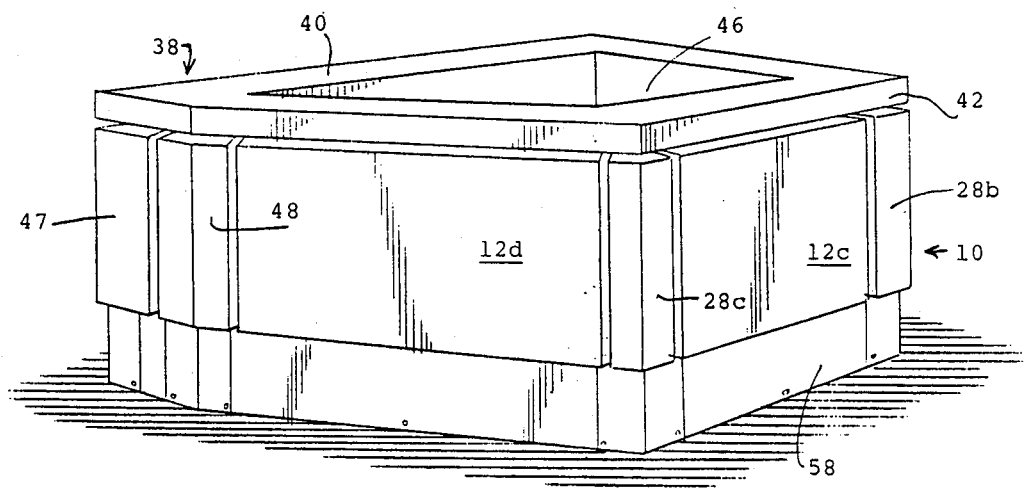
FIG. 1 is a perspective view of a knockdown furniture constructed in accordance with in the form of a planter.
Figure 2:
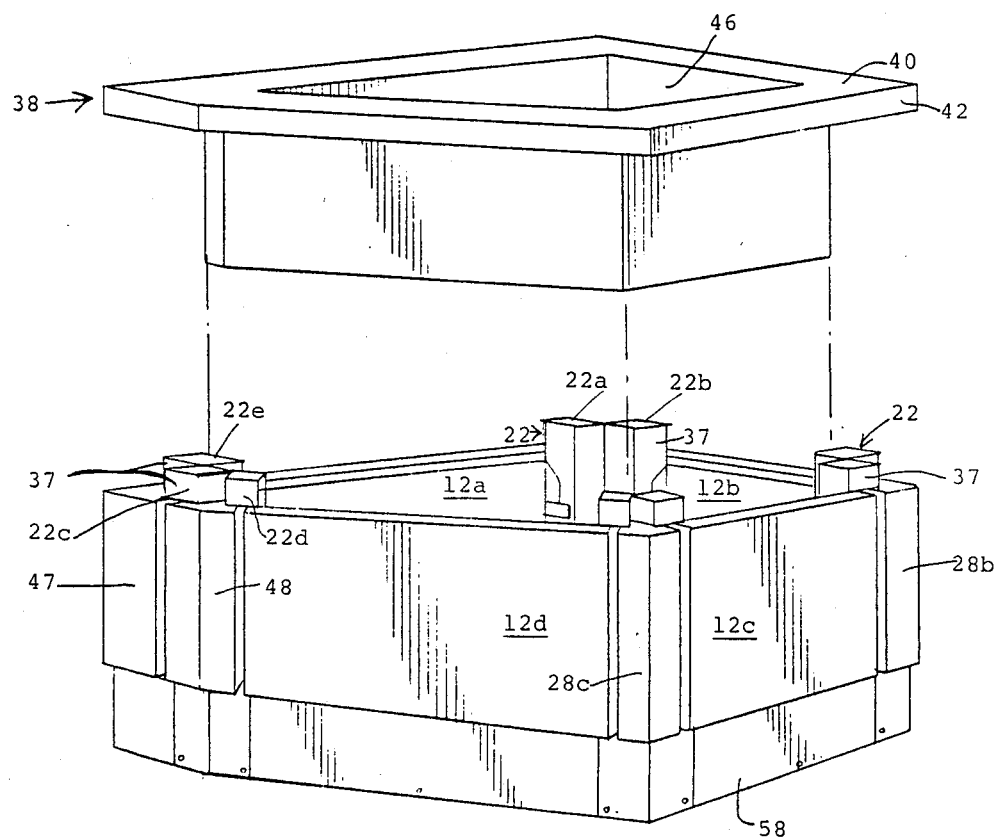
FIG. 2 is a view similar to FIG. 1 except showing the top exploded above the base.
Figure 5:
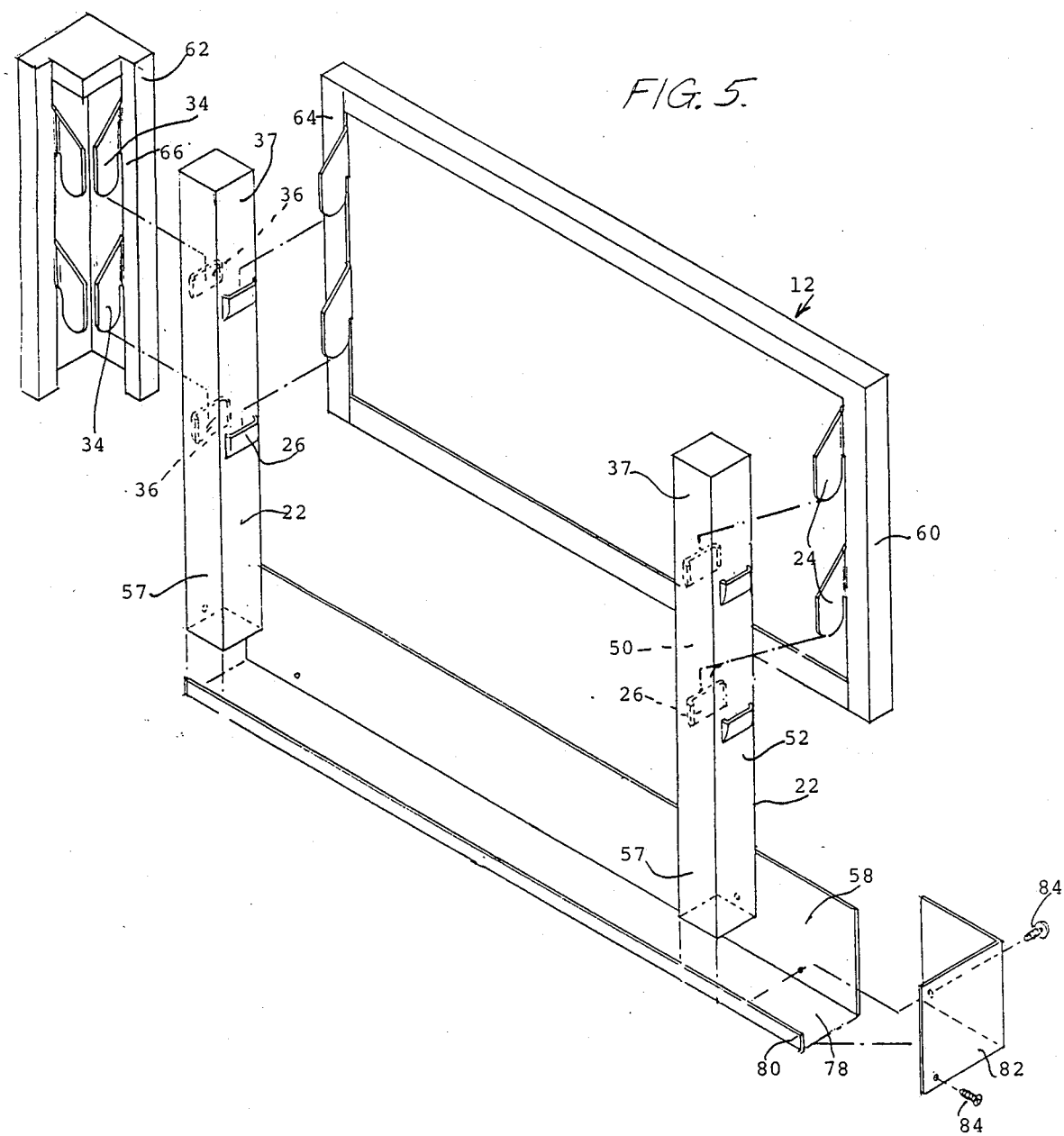
FIG. 5 is an exploded perspective view showing the basic components of a typical side of the furniture.

As can be seen in FIG. 5 each post has top and bottom ends 22a and 22b and, as can be seen in FIG. 2, each post has an upstanding end part 37 which extends freely above the pilasters and panels to position the top end 22a of each individual post 22 a predetermined distance above the pilasters and panels. A unitary cover member 38, having in horizontal cross section a shape complementary to the predetermined shape of the closed frame defined by the panels, posts and pilasters, includes a horizontal edge part 40 and a downturned flange 42 which is turned inwardly then upwardly and inwardly again in a reverse Z-shape as schematically shown in FIG. 6 to define a downwardly open channel 45 which closely embraces the upper ends 37 of the posts 22 and, as can be seen in FIG. 1, conceals them, at least in part, with the upper leg 43 of the reverse Z-shaped flange being continuous and integral with the cover and extending entirely about its periphery to rest on the top end of the posts. No other connecting means is required to join the cover to the frame.

The particular cover 38 illustrated is relatively deeply recessed at 46 to provide a receptical for plants. Obviously, the upper surface of the cover could be flat or shallowly recessed to receive a seat cushion or to serve as a display surface for merchandise.

The configuration of the frame as illustrated in FIGS. 1 through 3 is representative of the wide range of shapes permitted by the invention and where two panels converge to form an acute angle such as the angle 20 in FIG. 3, a single pilaster could be employed to join the adjacent posts together similar to the pilasters 28a, 28b, 28c. However, it is more esthetically pleasing as well as stronger to provide at acute angles of the frame a third post 22c as shown in FIG. 3 between the two end posts 22d and 22e, a first pilaster 47 joining one of the posts 22e at the end of panel 12a to the third post 22c and a second pilaster 48 joining the post 22d at the adjacent end of panel 12d to the third post 22c. With this arrangement it can be seen that the one pilaster 47 can be right angular similar to the pilasters 28c and 28b whereas the pilaster 48 can be similar to the obtuse angled pilaster 28a. The lengths of the panels defining the frame are preselected so that any desired frame shape will form angles corresponding to prefabricated pilasters, though it is, of course, within the purview of the invention to provide pilasters of any angularity to suit the user's tastes.

As shown best in FIG. 4 the posts are preferably square in cross section with each post having a front face 49 and side faces 50, 52. The panels and pilasters have inturned side edges, as generally indicated at 54 and 56, respectively, in FIG. 4, adapted to abut the front faces 49 of the posts, the fastening tongues 24 and 34 being carried on the edges whereby the front faces of the pilasters and panels are spaced outwardly away from the front faces of the posts by the depth of the inturned side edges. For certain types of furniture, as for exmplae a relatively high closet-like storage structure or room divider having a planter at the top, it is desirable that the end pilasters extend the full height of the structure, and the panels may also extend the full height, or standard sized smaller panels may be stacked to define the sides of a relatively tall structure such as a room divider. For relatively low structures the panels and pilasters may stop short of the floor with the posts having lower parts 57 (FIG. 5) extending downwardly a predetermined distance below the pilasters and panels, flat plates 58 abutting the downwardly extending parts 57 of the posts with the plane of the outer faces of the plates being spaced inwardly of the planes of the outer faces of the panels and the pilasters, as should be apparent in FIGS. 1 and 2.

As can be seen in FIG. 4 the side edges 54, 56 of the panels and pilasters are Z-shaped in horizontal cross section, the first legs 60, 62 thereof extending inwardly normal to the planes of the panel and pilaster faces, respectively, the central legs 64, 66 extending inwardly normal to the first legs parallel to and behind the panel and pilaster faces and the third legs defining the aforesaid downwardly extending tongues 24 and 34, respectively, for engagement with the slot means 26 and 36 on the side faces 50, 52 of each post. The respective central legs 64, 66 abut the front face 48 of each post, as seen in FIG. 4, with each center leg having a width such that the front faces of the posts are partly exposed between the first legs 60, 62 of the respective panel and pilaster side edges 54, 56 when the projections or tongues 24 and 34 are engaged with the slots 26, 36, respectively.

As can be seen in FIG. 5, the flat plates 58 may be provided with inwardly extending flanges 78 whose inner edge 80 may be bent upwardly to define a supporting track for the reception of the lower ends 57 of the posts. Corner brackets 82 are provided for abutting engagement with the faces of the plates 58 at the corners, fastening elements such as the screws 84 shown being provided for connecting the corner brackets 82 to the plates 58, the fastening elements also engaging the lower end of the posts. These are the only separate fastening means utilized in the assembly of the furniture.

A straight side of an article of furniture may consist of two or more aligned panels joined together at their adjacent ends by a single common post, or the adjacent ends of the panels can each be joined to a separate post, and a generally planar pilaster can join the two posts together.

The invention provides a wide range of uses of the component parts of panels, posts, pilasters and tops or covers to obtain different articles of furniture or different articles joined together to form a composite article as for example a planter between two seats, or a planter at one end of two seats or a room divider of any size and configuration. Though the side panels shown and described would normally be metal, e.g. stainless steel, the panels may for example comprise frames having fabric centers for use as a part or all of a wall of a room divider. Instead of stacked side panels forming the wall of a tall structure such as a room divider, cabinet drawers, shelves or lockers can be substituted. Because the construction of the basic components is the same no matter how long they may be, it is a simple matter to custom design furniture embracing the invention to suit a customer's needs. Thus the invention is susceptible of a variety of changes and modifications without however, departing from the scope and spirit of the appended claims.

I claim:

1. Knockdown furniture comprising a plurality of planar side panels each having inner and outer sides, at least some of which when the furniture is assembled being angularly related to each other to define a closed vertical frame having corners arranged between pairs of adjacently arranged angularly related said planar side panels, said closed vertical frame defining a predetermined shape, a separate vertical post located at each end of each said planar side panel, each side post having a top and bottom end, complementary interengaging releasable fastening means at said each end of each said planar side panel and on each said vertical post for connecting each said vertical post to said inner side at said each end of each said planar side panel, a pilaster located at each said corner, each said pilaster having two angularly related sides corresponding to an angle defined by each said pair of adjacently arranged planar side panels, additional complementary interengaging releasable fastening means on said two sides of each said pilaster and on each said vertical post for releasably connecting together two of said vertical posts and hence each said pair of adjacently arranged side panels, each said vertical post having an upstanding end part extending freely a predetermined distance above each said panel and each said pilaster, and a unitary cover member having a peripheral shape complementary to said predetermined shape of said closed frame defined by said panels, said vertical posts and said pilasters, said cover including an integral continuous flange extending entirely about its periphery to be received over the freely extending upstanding end parts of said vertical posts for resting on top ends of said vertical posts, said flange including a downturned part concealing, at least in part, the upstanding end parts of said vertical posts.

2. The knockdown furniture of claim 1, including a third vertical post arranged between two of said vertical posts located at ends of a pair of adjacently arranged said planar side panels forming a corner defining an acute angle, a first pilaster including means for releasably joining one of said posts attached at one of said adjacent ends of one of said planar side panels of said pair of adjacently arranged planar side panels with said third post, and a second pilaster including means joining another of said posts attached at another adjacent end of the other of said pair of adjacently arranged planar side panels with said third post.

3. The knockdown furniture of claim 1, wherein each of said vertical posts has front and side faces, and said planar side panels and said pilasters have planar front faces, and side edges, said side edges of each said panel and each said pilaster being inturned from their said front faces, to a predetermined depth, said inturned side edges abutting the front face of each said post a with said front face of each said planar side panel and each said pilaster being spaced outwardly from said front face of each said post by said predetermined depth of said inturned side edges, each of said vertical posts having a lower part extending downwardly a predetermined distance below each said planer side panel and each said pilaster, flat plates abutting the lower part of each said post, each said flat plate having a planar front face, a plane of each said front face of each said flat plate being spaced inwardly from the plane of each said front face of each said pilaster and each said planar side panel.

4. The knockdown furniture of claim 3, wherein each said side edge of each said pilaster and each said planar side panel has a Z-shape in horizontal cross section, one leg of said Z-shape extending inwardly normal to said plane of said front face of each said planar side panel and each said pilaster, each said Z-shape having a central leg extending normal to said one leg and parallel to and behind said front face of each said panel and each said pilaster, respectively, and each said Z-shape having a third leg extending rearwardly normal to said central leg, each said third leg including at least one downwardly extending hook-like projection for engagement with slot means on each said side face of each said vertical post, said projection and slot means defining said interengaging releasable fastening means, each said central leg of each said Z-shape abutting each said front face of each said post and having a width such that each said front face of each said post is partly exposed between said one leg of two adjacent of said Z-shapes when said hook-like projection of each is engaged with said slot means.

5. The knockdown furniture of claim 3, wherein said flat plates have inwardly extending flanges along their bottom edges to define tracks adapted to receive the lower end of each said posts.

6. The knockdown furniture of claim 5, including corner brackets for abutting engagement with said front faces of said plates at said corners of said frame, and fastening means for rigidly connecting said corner brackets to said plates and to said front faces of said posts.

* * * * *